United States Patent [19]

Johnston

[11] Patent Number: 4,671,388

[45] Date of Patent: Jun. 9, 1987

[54] PISTON AND CABLE TERMINATION ASSEMBLIES FOR HYDRAULIC CABLE-CYLINDER TYPE ELEVATORS

[75] Inventor: Everett E. Johnston, Newark, Tex.

[73] Assignee: Esco Elevators, Inc., Fort Worth, Tex.

[21] Appl. No.: 866,783

[22] Filed: May 23, 1986

[51] Int. Cl.[4] .......... B66B 9/04; F16J 1/00

[52] U.S. Cl. .......... 187/17; 92/137; 92/128; 92/255

[58] Field of Search .......... 187/17, 20.1 R; 92/137, 92/255, 128; 254/264

[56] References Cited

U.S. PATENT DOCUMENTS

| | | | |
|---|---|---|---|
| 494,217 | 3/1893 | Miles | 187/17 |
| 1,696,044 | 12/1928 | Kuskin | 92/137 X |
| 1,721,245 | 7/1929 | Black | 92/137 X |
| 2,187,042 | 1/1940 | Larson et al. | 92/137 X |
| 2,906,374 | 9/1959 | Brumby | 187/17 |
| 3,046,621 | 7/1962 | Morton | 22/68 |
| 4,048,909 | 9/1977 | Jepsen | 92/255 |
| 4,106,392 | 8/1978 | Johnson, Jr. et al. | 92/128 |
| 4,449,443 | 5/1984 | Föhl | 92/137 X |

*Primary Examiner*—Joseph J. Rolla
*Assistant Examiner*—Nils E. Pedersen
*Attorney, Agent, or Firm*—W. T. Wofford; James C. Fails; Arthus F. Zobal

[57] ABSTRACT

In a cable-cylinder type hydraulic elevator there is provided a piston and cable termination assembly that makes possible the removal and replacement of seal means and/or bearing means without the necessity for either disturbing the cable termination inside the cable socket member or cutting the cable and making a new termination.

5 Claims, 5 Drawing Figures

PISTON AND CABLE TERMINATION ASSEMBLIES FOR HYDRAULIC CABLE-CYLINDER TYPE ELEVATORS

FIELD OF INVENTION

The present invention relates to piston and cable termination assemblies for cable-cylinder type hydraulic elevators.

BACKGROUND OF THE INVENTION

A hydraulic eievator that is powered via a cable fixed at one end to a piston which is movable within a hydraulic cylinder is referred to herein as a cable-cylinder type.

In cable-cylinder type hydraulic elevators that are designed for passenger service safety requirements make it necessary that the cable be anchored at both ends in a manner which does not permit convenient access to the cable for the purpose of replacing piston assembly parts such as the normal piston sealing rings.

The objective of the present invention is to provide piston and cable termination assemblies that will permit convenient access to the cable for replacement of piston assembly parts, particularly seals.

DESCRIPTION OF PREFERRED EMBODIMENTS

Figure 1:
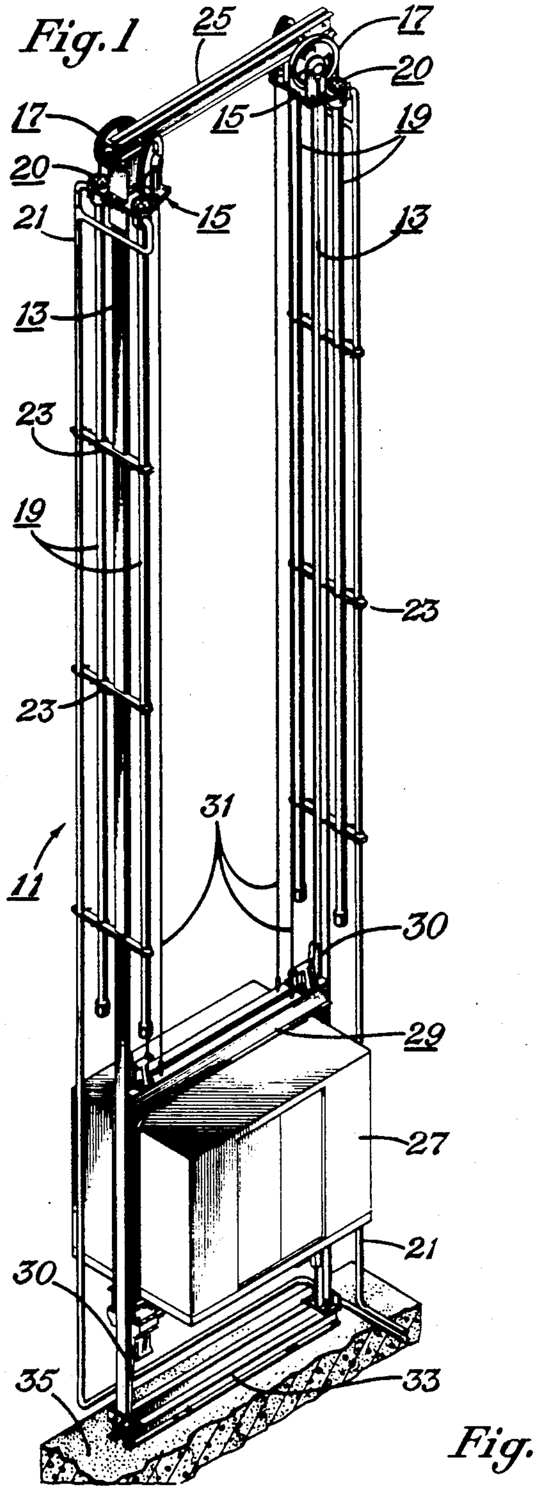
FIG. 1 is a schematic isometric view showing a cable-cylinder type hydraulic elevator in which the piston and cable termination assemblies of the present invention may be employed.

Referring now to the drawings, the cable-cylinder type hydraulic elevator 11 shown by FIG. 1 includes hoistway rail structures 13, head structures 15, sheave assemblies 17, hydraulic cylinder assemblies 19, cylinder head assemblies 20, hydraulic fluid supply lines 21, cylinder clamp bars 23, hoistway rail bridge structure 25, elevator car 27, elevator car suspension structure 29, elevator car guide shoe and emergency braking means 30, elevator car lift cables 31, hoistway rail structure support base means 33, and hoistway floor structure 35.

Figure 2:
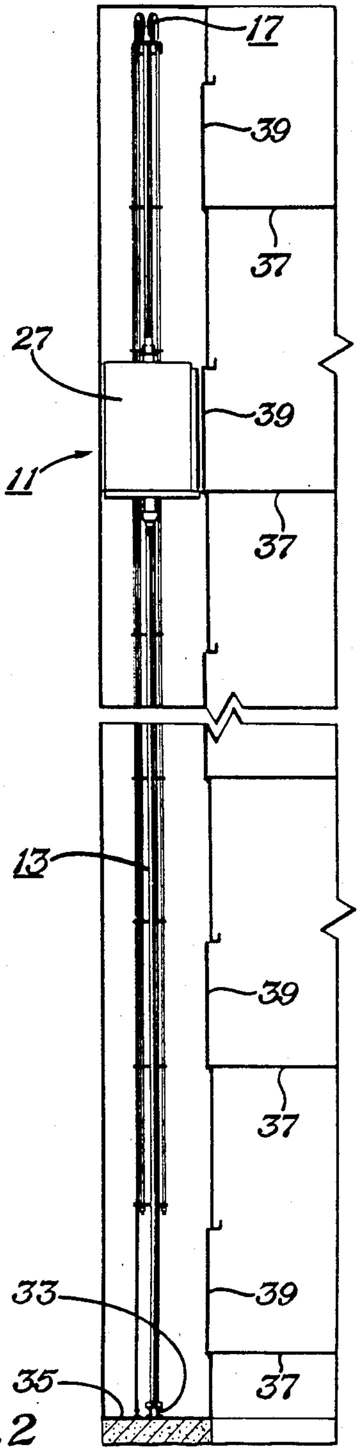
FIG. 2 is a schematic side elevational view showing a cable-cylinder type hydraulic elevator installed within an elevator hoistway.

In FIG. 2 there is shown a cable-cylinder type hydraulic elevator 11 like that of FIG. 1 installed in an elevator hoistway of a building structure, which hoistway traverses a number of floor levels 37, with an elevator door 39 indicated at each floor level.

The present invention may be utilized in the cable-cylinder type hydraulic elevators of FIGS. 1 and 2. The piston and cable termination assembly 40 of FIG. 3 would be incorporated within a respective hydraulic cylinder assembly 19.

Figures 3, 4, 5:
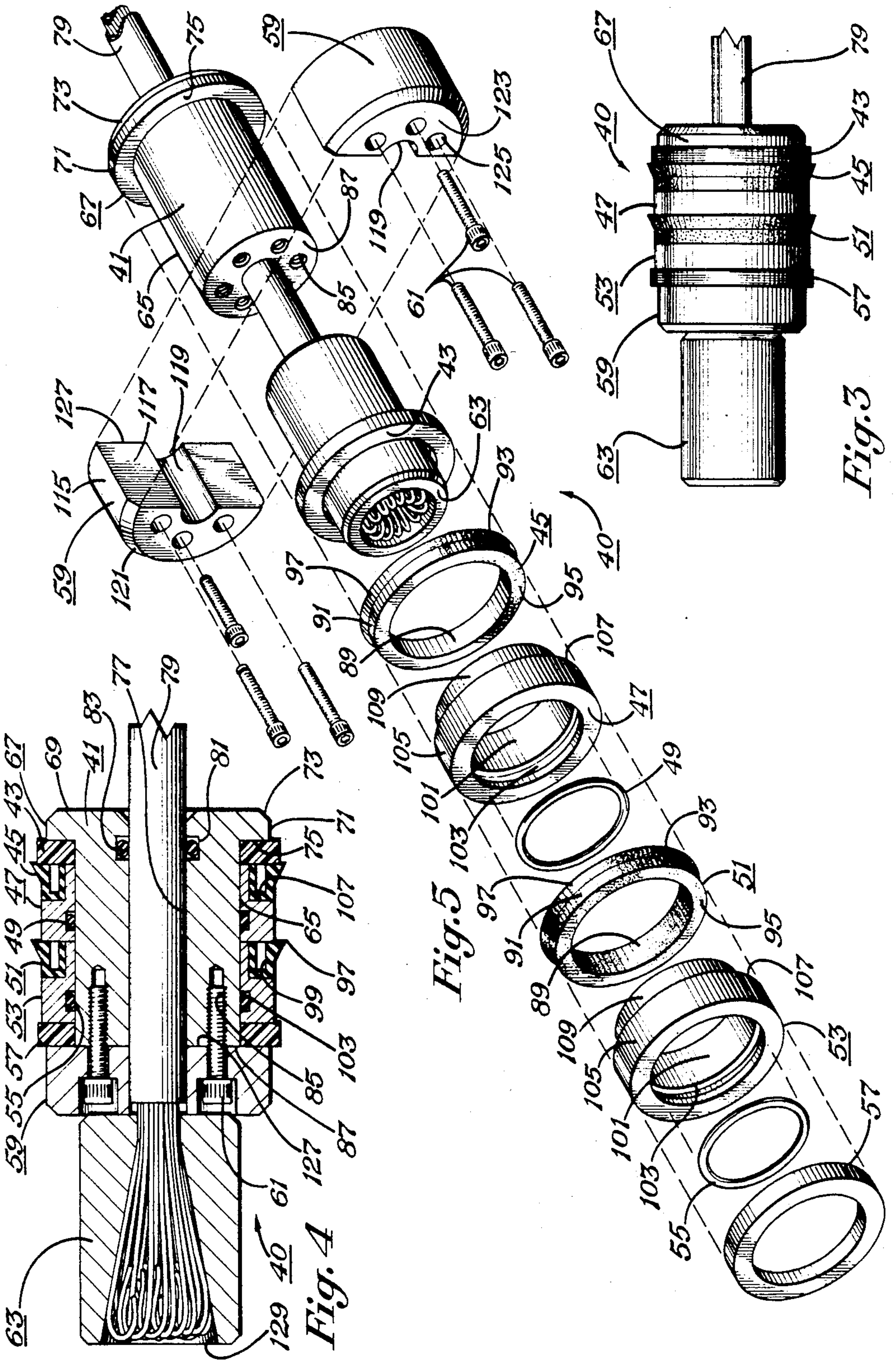
FIG. 3 is a schematic side elevational view showing a piston and cable termination assembly in accordance with a preferred embodiment of the invention.
FIG. 4 is a schematic longitudinal section view of the piston and cable termination assembly of FIG. 3.
FIG. 5 is a schematic isometric exploded view of the piston and cable termination assembly of FIG. 3.

As best shown by FIG. 5, a piston and cable termination assembly 40 in accordance with a preferred embodiment of the invention includes a piston body 41, an upper bearing 43, an upper seal 45, an upper seal adapter

47, an upper seal adapter o-ring 49, a lower seal 51, a lower seal adapter 53, a lower seal adapter o-ring 55, a lower bearing 57, lower retainer flange portions 59, cap screws 61, and a cable socket member 63.

Referring to FIGS. 4 and 5, the piston body 41 has a longitudinal axis and a mandrel portion 65 for receiving bearing means and seal means. The mandrel portion 65, with its cylindrical exterior surface,. has a maximum transverse dimension which is equal to its outside diameter. The piston body 41 is also provided an upper retainer flange 67 that is integral thereto in the preferred embodiment and is positioned such that the upper retainer flange upper surface is flush with the mandrel portion upper surface, thus creating a piston body upper surface 69. The exterior surface 71 of the upper retainer flange 67 is cylindrical and merges with an upper chamfered surface 73 which then merges with the piston body upper surface 69. The lower surface of the upper retainer flange 67 forms an annular shoulder surface 75 that merges with the exterior surface of the mandrel portion 65 and with the upper retainer flange exterior surface 71. A central bore 77, which is sized to receive coated elevator cable 79, extends through the piston body 41 coaxially with the piston body longitudinal axis. Located in the central bore is a circumferential groove 81 that receives a central bore o-ring 83 which provides a seal around the elevator cable 79 as the cable passes through the piston body 41 (see FIG. 4). Threaded bores 85 extend from the piston body lower surface 87 longitudinally into the lower end portion of the piston body 41 and are sized to receive the cap screws 61.

The upper and lower bearings 43, 57 are ring-shaped with cylindrical interior and exterior surfaces. The inside diameter of each bearing 43, 57 is sized to allow the bearing to be slid onto and matingly received by the piston body mandrel portion 65, while the outside diameter is greater than the diameter of the upper retainer flange 67.

The upper and lower seals 45, 51 are of a suitable conventional type and may be made of either plastic or rubber. Each seal 45, 51 is ring-shaped with cylindrical interior and exterior surfaces 89, 91 and annular top and bottom surfaces 93, 95. A lip 97 is provided that extends radially outward from the exterior surface 91 of the seal to sealingly engage the inside wall of the hydraulic cylinder assembly 19. Each seal 45, 51 has a reentrant portion 99 which opens to the top surface 93 of the seal.

Each seal adapter 47, 53 has a cylindrical interior surface formed by a central bore 101 which is sized to allow the seal adapter to be slid onto and matingly received by the piston body mandrel portion 65. A circumferential groove 103 in the seal adapter central bore 101 receives the respective seal adapter o-ring 49, 55. The seal adapter 47, 53 has a cylindrical first exterior surface 105 that merges with an annular shoulder surface 107 which in turn merges with a cylindrical second exterior surface 109. The second exterior surface 109, which receives one of the seals 45, 51, is of a smaller diameter than the first exterior surface 105. The end surfaces of the seal adapter are perpendicular to the seal adapter longitudinal axis.

The lower retainer flange portions 59 are semicylindrical in shape and have exterior and interior surfaces 115, 117. When the two lower retainer flange portions 59 are properly assembled together, the resulting cylindrical lower retainer flange has a longitudinal axis and an outside diameter that is greater than the outside diameter of the piston body mandrel portion 65 but less than the outside diameter of the bearings 43, 57. A semi-cylindrical channel 119 extends longitudinally through each lower retainer flange portion interior surface 117. The channel 119 forms half of a central bore through the lower retainer flange that is sized to matingly receive the elevator cable 79. The lower retainer flange portion exterior surface 115 merges with a lower chamfered surface 121 which merges with a lower retainer flange portion bottom surface 123. Countersunk bores 125 traverse longitudinally from the lower retainer flange portion bottom surface 123 to the lower retainer flange portion top surface 127 and are positioned so as to be aligned with the piston body threaded bores 85 when the lower retainer flange portions 59 are assembled onto the piston body 41.

The cable socket member 63 has a cylindrical exterior surface and an opening 129 for receiving and terminating the end portion of the elevator cable 79. The outside diameter of the cable socket member 63 is less than or equal to, but does not exceed, the outside diameter of the piston body mandrel portion 65. In the preferred embodiment, the opening 129, which is coaxial to the longitudinal axis of the cable socket member 63, includes, a cylindrical bore and a frustum-shaped counterbore.

To assemble the piston and cable termination assembly 40 of the present invention, the central bore o-ring 83 is inserted into the piston body circumferential groove 81. The respective seal adapter o-rings 49, 55 are installed in the respective seal adapter circumferential grooves 103 and the respective seals 45, 51 are assembled onto the respective seal adapter second exterior surfaces 109 such that the bottom surfaces 95 of the seals are adjacent to the seal adapter shoulder surfaces 107. Then the bearing and seal components are pushed onto the piston body mandrel portion 65 in the following order. The upper bearing 43 is first pushed onto the mandrel portion 65 and up against the upper retainer flange shoulder surface 75. Next, the upper seal adapter 47 and the upper seal 45 are pushed onto the piston body mandrel portion 65 so that the upper seal abuts the upper bearing 43. The lower seal adapter 53 and the lower seal 51 are pushed onto the piston body mandrel portion 65, oriented in the same manner as the upper seal adapter and the upper seal, followed by the lower bearing 57. The seal adapters 47, 53 and bearings 43, 57 are retained on the mandrel portion by assembling the lower retainer flange portions 59 onto the lower end of the piston body 41 such that the lower retainer flange portion top surfaces 127 abut the piston body lower surface 85 and the lower retainer flange portion countersunk bores 125 are aligned with the piston body threaded bores 85. The lower retainer flange portions 59 are held in position by the cap screws 61 that are inserted into the respective countersunk and threaded bores 125, 85.

The assembled piston is pushed onto the respective end of the elevator cable 79. The unterminated cable end passes through the piston body and lower retainer flange central bores. Then the unterminated cable end is inserted through the cable socket member 63 such that the cable 79 exits the cable socket member from the counterbore, an appropriate length of the coating having been removed from the end portion of the cable. Next, the individual cable strands are spread apart and the ends are bent inwardly as shown in FIG. 4. The cable end is then pulled back into the counterbore of the cable socket member 63, compressing the cable strands. The voids between the cable strands inside of the cable socket member are filled in the conventional manner with suitable material such as babbitt or thermoplastic (not shown). The assembly of the piston and cable termination assembly 40 is now complete. The assembled piston may be pushed down along the cable 79 until the lower retainer flange bottom surface 123 abuts the upper surface of the cable socket member 63 as shown in FIG. 3.

The essence of the present invention is that it makes possible the removal and replacement of seal means and/or bearing means without the necessity for either disturbing the cable termination inside the cable socket member or cutting the cable and making a new termination. This is accomplished by the provision of removable lower retainer means made up of a plurality of radially separable parts, together with a cable socket member having a maximum transverse dimension which does not exceed the maximum transverse dimension of the piston body mandrel portion. Thus, when the lower retaining means is removed, the bearing means and seal means can be moved downwardly off the piston body mandrel and over the cable socket member.

In the embodiment shown the seal means would include seals 45, 51, o-rings 49, 55, 83 and seal adapters 47, 53. The active seals 45, 51 would of course require replacement more often than other seal means parts or the bearing means 43, 57.

In a preferred embodiment the seals 45, 51 would be plastic, seal adapters 47, 53 aluminum, and the bearing means 43, 57 laminated plastic. Alternatively, the seals 45, 51 could be rubber and the bearing means 43, 57 could be solid plastic or brass.

The foregoing disclosure and the showings made in the drawings are merely illustrative of the principles of this invention and are not to be interpreted in a limiting sense.

I claim:

1. A piston and cable termination assembly for a hydraulic cable-cylinder type elevator comprising:

a. a piston body having a longitudinal axis and a mandrel portion having a maximum transverse dimension, said piston body further having a central bore sized for receiving elevator cable;

b. bearing means and seal means disposed on said piston body mandrel portion;

c. upper retainer means for said bearing and seal means disposed at the upper end of said piston body mandrel portion;

d. lower retainer means for said bearing and seal means disposed at the lower end of said piston body mandrel portion, with said lower retainer means having a longitudinal axis and being made up of a plurality of radially separable portions which when assembled make up a retainer means having a maximum transverse dimension which is greater than that of said mandrel portion and having a central bore sized for receiving said elevator cable; and means for removably fixing said radially separable portions to the lower end of said piston body;

e. a cable socket member having a longitudinal axis and an opening for receiving and terminating the end portion of said elevator cable, and having a maximum transverse dimension which does not exceed that of said piston body mandrel portion;

whereby said bearing means and said seal means can be removed from said piston body mandrel portion over said cable socket member when the radially separable portions of said lower retainer means are removed.

2. The device of claim 1 wherein the exterior surfaces of said piston body mandrel portion, said cable socket member, said upper and lower retainer means, said bearing means and said seal means and the interior surfaces of said bearing means and said seal means, are cylindrical.

3. The device of claim 2 wherein said lower retainer means is made up of two separable portions.

4. The device of claim 3 wherein said upper retainer means is an integral part of said piston body.

5. The device of claim 3 wherein said means for removably fixing said radially separable portions to the lower end of said piston body comprises cap screws which extend in the longitudinal direction through respective said radially separable portions and are threaded into said piston body.

* * * * *